US011940141B1

(12) United States Patent
Zheng et al.

(10) Patent No.: US 11,940,141 B1
(45) Date of Patent: Mar. 26, 2024

(54) WAKE-UP LAMP

(71) Applicant: Shenzhen Bolong Technology Co. Ltd., Shenzhen (CN)

(72) Inventors: Huazhu Zheng, Shenzhen (CN); Yunyun Lu, Shenzhen (CN); Caijian Zheng, Shenzhen (CN); Wenzhen Ouyang, Shenzhen (CN)

( * ) Notice: Subject to any disclaimer, the term of this patent is extended or adjusted under 35 U.S.C. 154(b) by 0 days.

(21) Appl. No.: 18/457,263

(22) Filed: Aug. 28, 2023

(30) Foreign Application Priority Data

Jul. 28, 2023 (CN) ........................ 202322032326.X

(51) Int. Cl.
*F21V 33/00* (2006.01)
*F21S 6/00* (2006.01)
*F21V 11/16* (2006.01)
*F21V 23/00* (2015.01)
*F21V 23/04* (2006.01)
*F21Y 103/33* (2016.01)
*F21Y 115/10* (2016.01)
*G04B 19/04* (2006.01)

(52) U.S. Cl.
CPC .......... *F21V 33/0056* (2013.01); *F21S 6/002* (2013.01); *F21V 11/16* (2013.01); *F21V 23/008* (2013.01); *F21V 23/045* (2013.01); *G04B 19/04* (2013.01); *F21Y 2103/33* (2016.08); *F21Y 2115/10* (2016.08)

(58) Field of Classification Search
CPC .... F21V 33/0056; F21V 11/16; F21V 23/008; F21V 23/045; F21S 6/002; G04B 19/04; F21Y 2103/33; F21Y 2115/10
See application file for complete search history.

(56) References Cited

U.S. PATENT DOCUMENTS

| | | | | |
|---|---|---|---|---|
| 5,959,394 | A | 9/1999 | Lin | |
| 9,714,904 | B2 * | 7/2017 | Chang | G01N 21/8806 |
| 11,268,663 | B2 * | 3/2022 | Salzinger | F21V 23/0435 |
| 11,578,855 | B2 | 2/2023 | Liu et al. | |
| 2004/0174711 | A1 | 9/2004 | Wu | |

(Continued)

*Primary Examiner* — Peggy A Neils

(57) ABSTRACT

The present utility model discloses a wake-up lamp, including: a housing, where the housing is annular, a mounting cavity is formed in the housing, a first mounting opening is provided in an inner side of the housing, and the first mounting opening is in communication with the mounting cavity; a first lampshade, where the first lampshade is mounted at the first mounting opening, and a shape of the first lampshade is adapted to that of the housing; a light-emitting component, where the light-emitting component is arranged in the mounting cavity and includes at least one first light bar, a shape of the first light bar is adapted to that of the first lampshade, and the first light bar emits light towards the first lampshade; a main control board, where the main control board is arranged in the mounting cavity and electrically connected to the light-emitting component so as to control a light-emitting mode of the light-emitting component; and a timing component, where the timing component is arranged in the mounting cavity and includes a timer and an alarm module, and the timer and the alarm module are electrically connected to the main control board. The technical solution of the present utility model effectively improves the practicability of the wake-up lamp.

14 Claims, 5 Drawing Sheets

(56) References Cited

U.S. PATENT DOCUMENTS

| | | | | |
|---|---|---|---|---|
| 2007/0014563 | A1 | 1/2007 | Ferro | |
| 2021/0071846 | A1 | 3/2021 | Liu et al. | |
| 2021/0317959 | A1 | 10/2021 | Lin | |
| 2023/0041557 | A1 * | 2/2023 | Lee | G03B 29/00 |

* cited by examiner

WAKE-UP LAMP

TECHNICAL FIELD

The present utility model relates to the technical field of lighting, and in particular, to a wake-up lamp.

BACKGROUND

With the continuous development of society and the advancement of science and technology, people pay more and more attention to the quality of life and health. As an important part of human health, sleep plays a key role in maintaining physical and mental health and improving the quality of life. In recent years, with the development of smart technology, a smart lamp has attracted more attention as an important element in home life.

In the process of improving the sleep quality, a wake-up lamp emerges as a new type of smart lamp. The conventional night lamp mainly adopts the design of external light-emitting in the aspect of sleep wake-up, that is, a lampshade is provided on a light source for divergent lighting. However, there are problems with this conventional design, such as too dazzling and uncomfortable light, and therefore the practicability of the wake-up lamp is limited to some extent.

SUMMARY

A primary objective of the present utility model is to provide a wake-up lamp, which aims to solve the technical problem that the existing wake-up lamp is low in practicability.

To achieve the objective, the present utility model provides a wake-up lamp, including:

- a housing, where the housing is annular, a mounting cavity is formed in the housing, a first mounting opening is provided in an inner side of the housing, and the first mounting opening is in communication with the mounting cavity;
- a first lampshade, where the first lampshade is mounted at the first mounting opening, and a shape of the first lampshade is adapted to that of the housing;
- a light-emitting component, where the light-emitting component is arranged in the mounting cavity and includes at least one first light bar, a shape of the first light bar is adapted to that of the first lampshade, and the first light bar emits light towards the first lampshade;
- a main control board, where the main control board is arranged in the mounting cavity and electrically connected to the light-emitting component so as to control a light-emitting mode of the light-emitting component; and
- a timing component, where the timing component is arranged in the mounting cavity and includes a timer and an alarm module, and the timer and the alarm module are electrically connected to the main control board.

Optionally, the first light bar includes a circuit board and a first light source arranged on the circuit board, and the first light source includes at least one cold white lamp bead and/or at least one warm white lamp bead and/or at least one RGB colored lamp bead.

Optionally, the first light source includes at least one RGB colored lamp bead, the first light bar further includes a single chip microcontroller arranged on the circuit board, and the single chip microcontroller is electrically connected to the RGB colored lamp bead.

Optionally, there are a plurality of the first light sources, and the plurality of first light sources are arranged at intervals along a length direction of the circuit board.

Optionally, the main control board includes a current adjustment module, and the current adjustment module is electrically connected to the first light bar.

Optionally, the wake-up lamp further includes a display module arranged on the housing and electrically connected to the main control board.

Optionally, the wake-up lamp further includes a voice activated module mounted on and electrically connected to the main control board.

Optionally, the wake-up lamp further includes a wireless transmission module arranged on and electrically connected to the main control board.

Optionally, a plurality of mounting blocks are arranged at intervals on an inner wall of the housing, the mounting blocks are provided with mounting grooves, and the first light bar is partially embedded in the mounting grooves.

Optionally, the wake-up lamp further includes a fixing plate, where the fixing plate is fixed on the inner wall of the housing, one side of the mounting block is fixed on the inner wall of the housing, and the other opposite side of the mounting block is fixed on the fixing plate.

Optionally, the housing includes a front housing and a rear housing, the front housing and the rear housing are fastened to form the mounting cavity, the front housing and the rear housing are provided with the mounting blocks, the mounting block of the front housing and the mounting block of the rear housing are spaced apart from each other to form a mounting space, and the first light bar is arranged in the mounting space.

Optionally, the mounting block protrudes from the fixing plate and a portion of the mounting block protruding from the fixing plate is of a slope surface, and the mounting groove is formed on the slope surface.

Optionally, the wake-up lamp further includes a second lampshade and a second light bar, where a second mounting opening is formed at an outer side of the housing, the second lampshade is mounted on the second mounting opening, the second light bar is arranged in the mounting cavity and faces the second lampshade, and the second light bar includes at least one cold white lamp bead and/or at least one warm white lamp bead and/or at least one RGB colored lamp bead.

According to the technical solution, the housing is annular, the mounting cavity is formed in the housing, the first mounting opening in communication with the mounting cavity is formed in the inner side of the housing, the first lampshade is mounted on the first mounting opening, the main control board and the timing component electrically connected to the main control board are further arranged in the mounting cavity, and the timing component is used for timing and waking up a user from sleeping in a light irradiation mode. Specifically, the light irradiation waking up is implemented by arranging the light bar in the mounting cavity and emitting light towards the first lampshade, so that an illumination environment is generated to wake up the user; in addition, the light bar emits light towards the inner side of the housing, so that the light is effectively prevented from being directly irradiated to the user, the comfort of the user is improved, and the practicability of the wake-up lamp is improved.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

Figure 1:
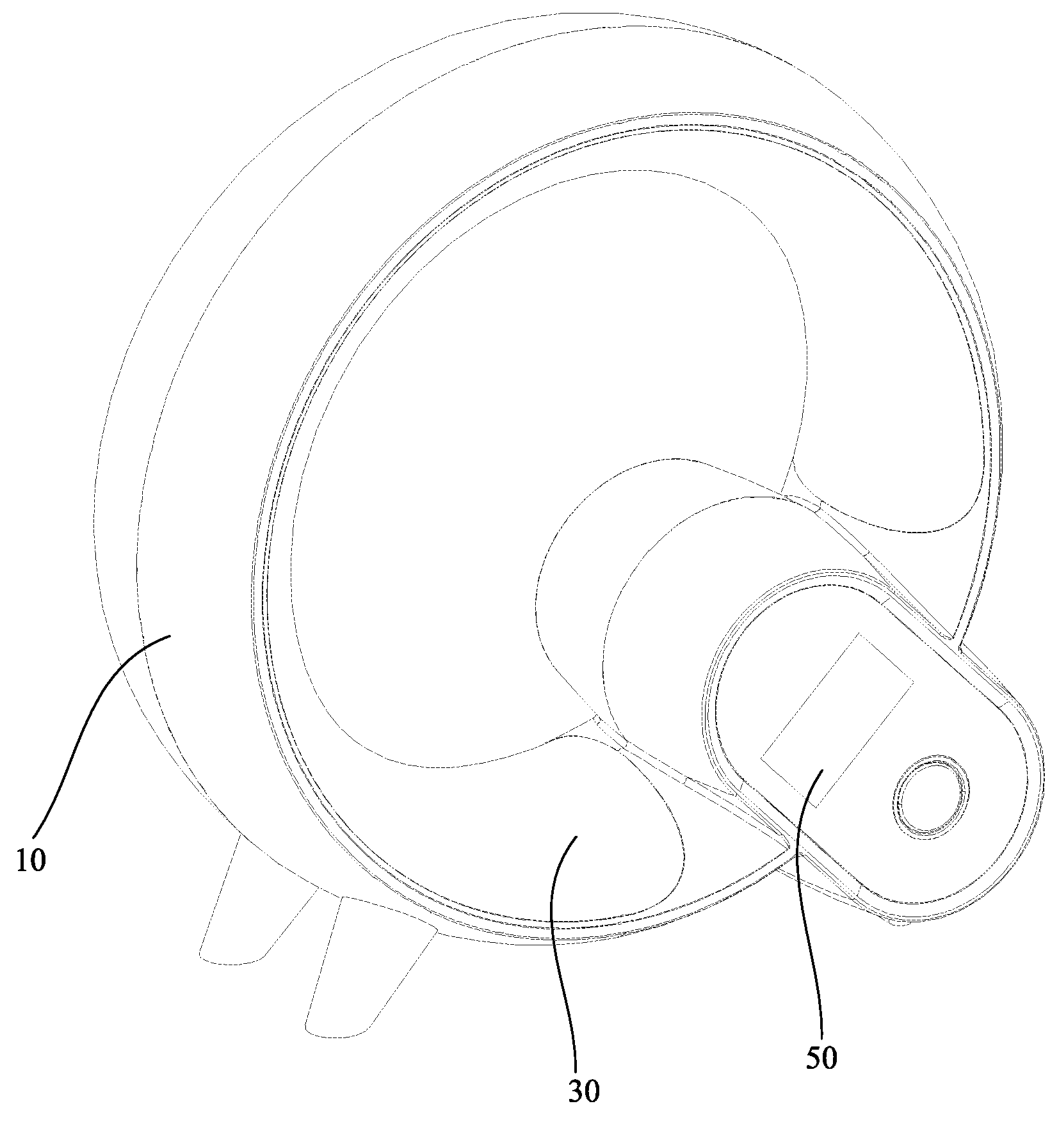
FIG. 1 is a schematic diagram of a structure of an embodiment of a wake-up lamp according to the present utility model.

| Reference numeral | Name | Reference numeral | Name |
|---|---|---|---|
| 10 | Housing | 21 | First light bar |
| 11 | Front housing | 211 | Circuit board |
| 12 | Rear housing | 212 | Cold white lamp bead |
| 14 | First mounting opening | 213 | Warm white lamp bead |
| 15 | Mounting block | 214 | RGB colored lamp bead |
| 151 | Mounting groove | 22 | Single chip microcontroller |
| 16 | Fixing plate | 23 | Second light bar |
| 17 | Second mounting opening | 30 | First lampshade |
| 40 | Main control board | 60 | Second lampshade |
| 50 | Display module | | |

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative position relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of technical features indicated. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such combination of the technical solutions should not be considered to exist, and is not within the protection scope of the present utility model.

The present utility model provides a wake-up lamp.

In an embodiment of the present utility model, as shown in FIGS. 1 to 6, the wake-up lamp includes:

a housing 10, where the housing 10 is annular, a mounting cavity is formed in the housing 10, a first mounting opening 14 is provided in an inner side of the housing 10, and the first mounting opening 14 is in communication with the mounting cavity;

a first lampshade 30, where the first lampshade 30 is mounted at the first mounting opening 14, and a shape of the first lampshade 30 is adapted to that of the housing 10;

a light-emitting component, where the light-emitting component is arranged in the mounting cavity and includes at least one first light bar 21, a shape of the first light bar 21 is adapted to that of the first lampshade 30, and the first light bar emits light towards the first lampshade 30;

a main control board 40, where the main control board 40 is arranged in the mounting cavity, and the main control board 40 is electrically connected to the light-emitting component so as to control a light-emitting mode of the light-emitting component; and a timing component, where the timing component is arranged in the mounting cavity and includes a timer and an alarm module, and the timer and the alarm module are electrically connected to the main control board 40.

In this embodiment, the housing 10 is a housing of the wake-up lamp and is used to protect other components of the wake-up lamp and provide mounting positions for other components of the wake-up lamp. The housing 10 is annular in design, so that the light can be uniformly distributed in an annular inner space, rather than being concentrated on a certain point, thereby implementing a more uniform and soft light effect. Specifically, the housing 10 has a central axis, one side that is of the housing 10 and that is close to the central axis is an inner side, one side that is far away from the central axis is an outer side, the inner side of the housing 10 is provided with the first mounting opening 14, the first lampshade 30 is arranged on the first mounting opening 14, the first light bar 21 is arranged in the mounting cavity and emits light towards the first lampshade 30, the first lamp housing 30 has an arc shape corresponding to a shape of the housing 10, the annular design of the housing 10 ensures proper positioning and secure mounting of the first lampshade 30 and provides a suitable space to accommodate the first lampshade 30, and the arc shape of the first lampshade 30 is adapted to the annular shape of the housing 10, so that the first lampshade 30 completely covers the light-emitting component, direct irradiation of dazzling light is effectively prevented, visual health of a user is protected, and a more comfortable light environment is provided.

The timing component is used to gradually wake up a user through preset wake-up time when the wake-up lamp reaches the preset time, and meanwhile, the timing component cooperates with the alarm module to remind the user to get up, so that a convenient wake-up function is provided for the user.

According to the technical solution, the housing 10 is annular, the mounting cavity is formed in the housing, the first mounting opening 14 in communication with the mounting cavity is formed in the inner side of the housing 10, the first lampshade 30 is mounted on the first mounting opening 14, the main control board 40 and the timing component electrically connected to the main control board 40 are further arranged in the mounting cavity, and the timing component is used for timing and waking up a user from sleeping in a light irradiation mode. Specifically, the light irradiation waking up is implemented by arranging the first light bar 21 in the mounting cavity and emitting light towards the first lampshade 30, so that an illumination environment is generated to wake up the user; in addition, the first light bar 21 emits light towards the inner side of the housing 10, so that the light is effectively prevented from being directly irradiated to the user, the comfort of the user is improved, and the practicability of the wake-up lamp is improved.

Figure 2:
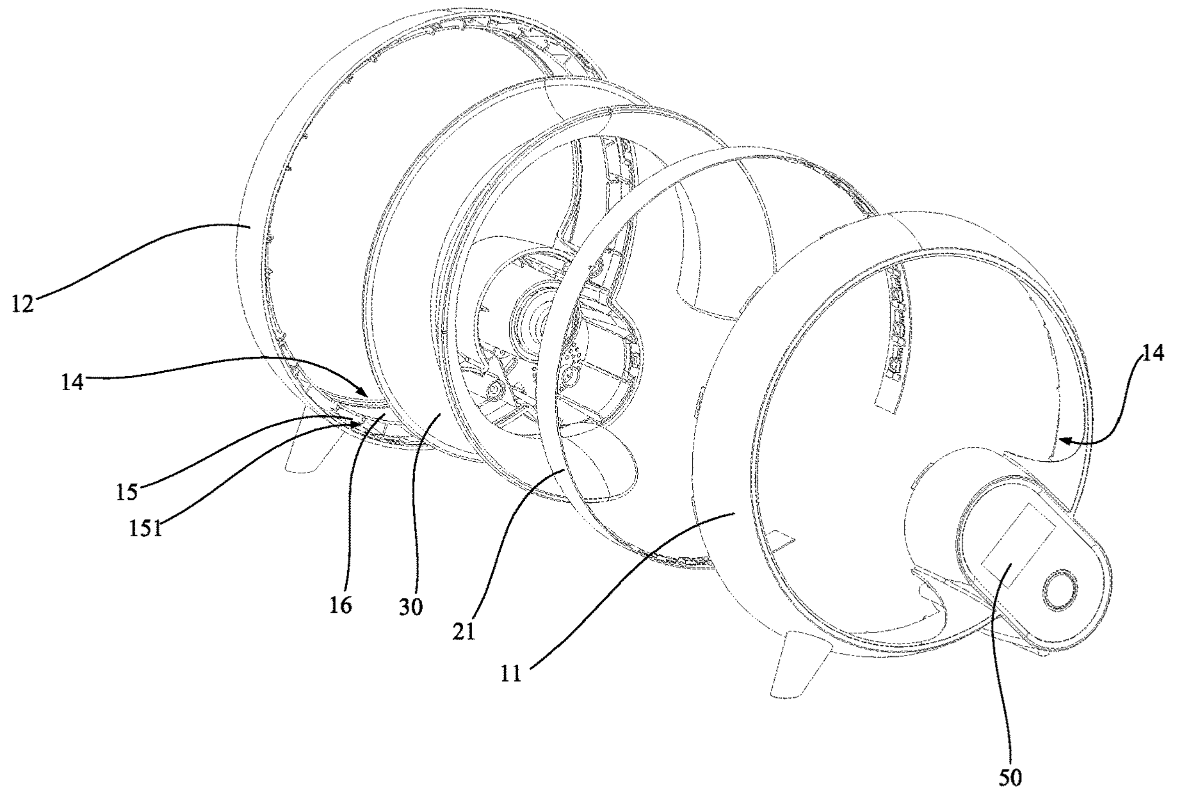
FIG. 2 is a schematic diagram of a structure of an angle decomposition state of a wake-up lamp according to the present utility model.
Figure 3:
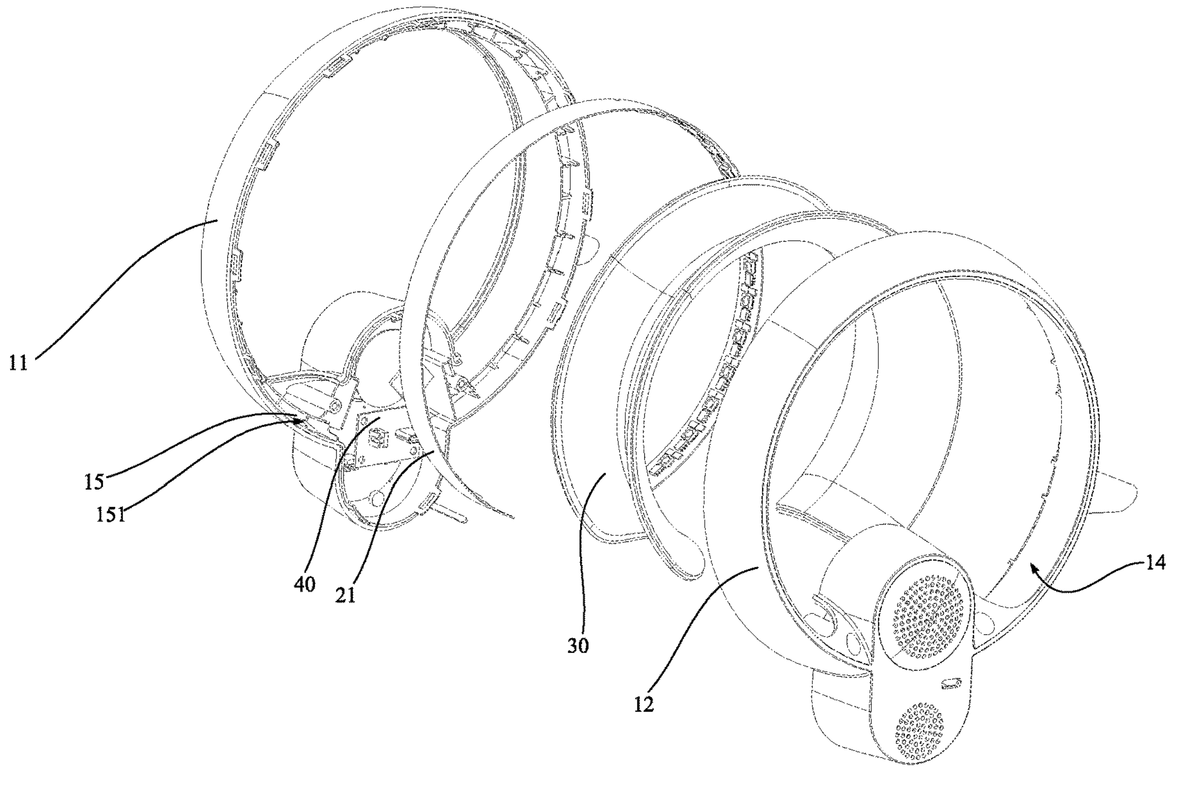
FIG. 3 is a schematic diagram of a structure of another angle decomposition state of a wake-up lamp according to the present utility model.
Figure 4:
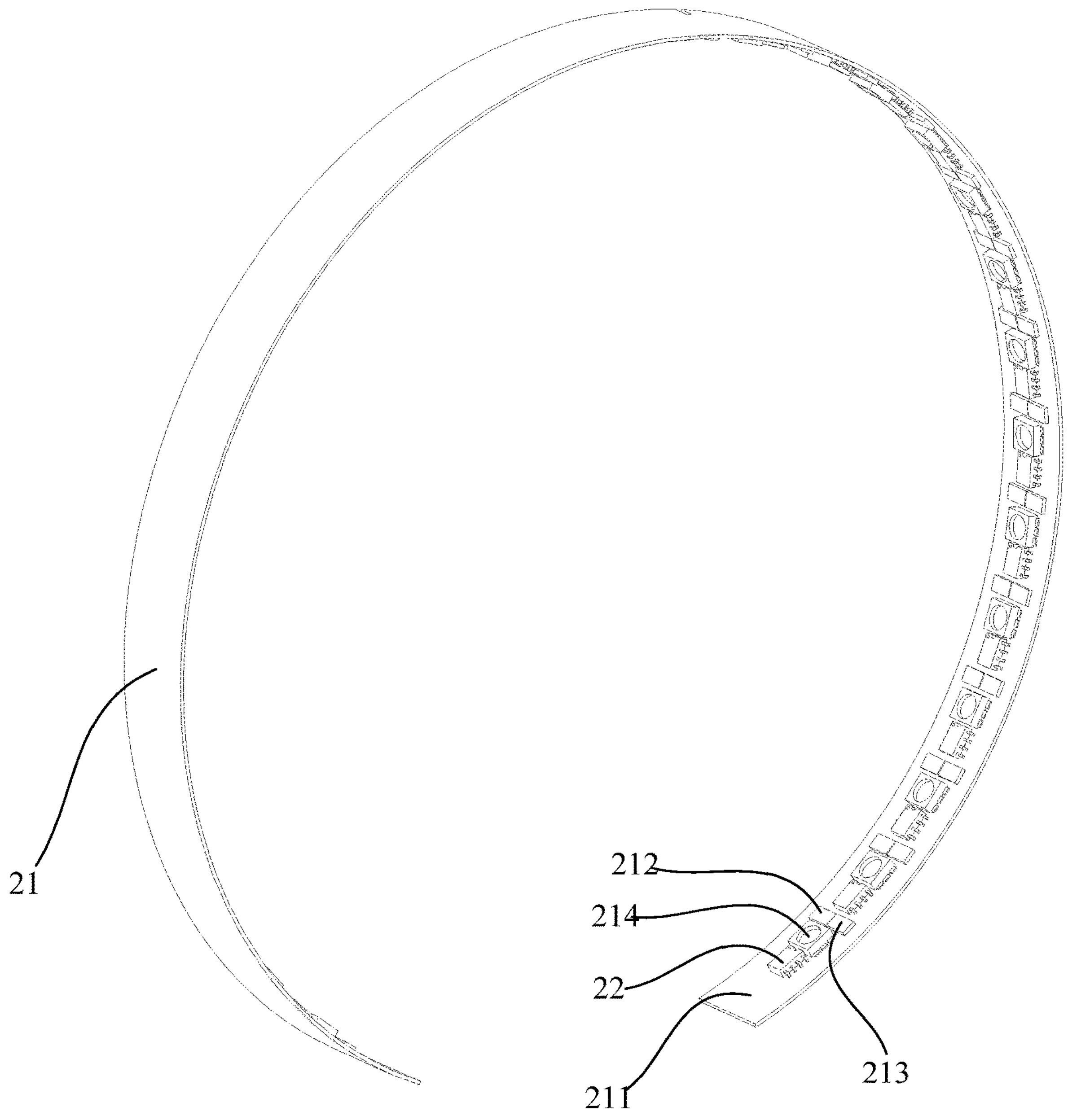
FIG. 4 is a schematic diagram of a structure of a light bar.

Further, as shown in FIGS. 2 to 4, the first light bar 21 includes a circuit board 211 and a first light source arranged on the circuit board 211, and the first light source includes at least one cold white lamp bead 212 and/or at least one warm white lamp bead 213 and/or at least one RGB colored lamp bead 214. In this embodiment, the circuit board 211 is used to provide a mounting position for a first light source and control the first light source to emit light; and the circuit board 211 is provided with at least one colored lamp, where the cold white lamp bead 212 emits a light presenting a cold color, is generally used to provide a bright lighting effect, and is suitable for the brightness adjustment of the wake-up lamp and the supplement of indoor lighting; the warm white lamp bead 213 emits a light presenting a warm yellow tint, is generally used to create a pleasant atmosphere and to provide a soft lighting effect, and is suitable for comfort mode of a wake-up lamp and night use; and the RGB colored lamp beads 214 are a multi-colored LED lamp bead including red, green, and blue LED lamp beads. The multi-colored LED lamp beads can adjust the brightness of each color by controlling a magnitude and frequency of the current, so that the combination and the change of various colors are implemented to achieve a fantasy-color light effect, and the interestingness and the personalization can be effectively added to the wake-up lamp.

It should be noted that, the specific quantity of the foregoing three lamp beads in this embodiment is not limited, and a specific quantity can be combined according to an actual requirement.

Further, as shown in FIGS. 2 to 4, the first light source includes at least one RGB colored lamp bead 214, the first light bar 21 further includes a single chip microcontroller 22 arranged on the circuit board 211, and the single chip microcontroller 22 is electrically connected to the RGB colored lamp bead 214. In this embodiment, the single chip microcontroller 22 is an integrated circuit chip with calculation and control functions, and can precisely control the power supply of the RGB colored lamp beads 214, and then control a light-emitting mode of the RGB colored lamp beads 214. Specifically, the single chip microcontroller 22 is also electrically connected to the main control board 40, and sends a control signal to the single chip microcontroller 22 through the main control board 40; therefore, the single-chip micro-controller 22 controls the RGB colored lamp beads 214 to emit light of corresponding colors, so that the wake-up lamp can display more diverse and personalized fantasy-color effects, and provide users with a more colorful use experience.

Further, as shown in FIGS. 2 to 4, there are a plurality of the first light sources, and the plurality of first light sources are arranged at intervals along a length direction of the circuit board 211. In this embodiment, the plurality of first light sources are used to form a moving light-emitting effect. Specifically, a plurality of first light sources are arranged at intervals along a length direction of the circuit board 211. Since the circuit board 211 is arranged around an inner wall of the housing 10, the wake-up lamp can realize a surrounding light effect. Therefore, the diversity of the light-emitting modes of the wake-up lamp is effectively improved, thereby improving the practicability of the wake-up lamp.

Further, the main control board 40 includes a current adjustment module, and the current adjustment module is electrically connected to the first light bar 21. In this embodiment, the current adjustment unit is configured to perform control, specifically, to gradually increase or decrease an amount of current flowing through the first light bar 21 according to an execution instruction given by the main control board 40, so that the annular first light bar 21 gradually becomes brighter or darker to implement the change and switch of the light state.

Further, the wake-up lamp further includes a display module 50, and the display module 50 is arranged on the housing 10 and electrically connected to the main control board 40. In this embodiment, the wake-up lamp can display different information or patterns on the housing 10 such as time, date, and weather conditions by adding the display module 50. This provides users with more practical functions and information display, and enhances the intelligence and interactivity of the wake-up lamp.

In addition, the wake-up lamp can also be provided with a temperature sensor, and the temperature sensor is electrically connected to the main control board 40 so as to transmit relevant data of the temperature sensor to the display module 50 for displaying by the main control board 40.

Further, the wake-up lamp further includes a voice activated module, and the voice activated module is mounted on the main control board 40 and is electrically connected to the main control board 40. In this embodiment, the voice activated module is used to collect a voice around the wake-up lamp. Specifically, the voice activated module is electrically connected to the main control board 40. When collecting the voice around the wake-up lamp, the voice activated module will generate an electronic signal and send the electronic signal to the main control board 40. The main control board 40 sends a control command to the light-emitting component according to the electronic signal, and the light-emitting component switches the light-emitting mode corresponding to the command according to the control command, therefore, the light-emitting modes of the wake-up lamp are diversified, and the intelligence and interactivity of the wake-up lamp are effectively improved.

It should be noted that the voice activated module of this embodiment can specifically implement the switching of the light-emitting mode through the user's voice, and can also switch the light-emitting mode through music, so that the light follows the rhythm of the music, effectively improving the interestingness and entertainment of the wake-up lamp.

Further, the wake-up lamp further includes a wireless transmission module, and the wireless transmission module is arranged on the main control board 40 and is electrically connected to the main control board 40. In this embodiment, through the wireless transmission module, the wake-up lamp can communicate with other devices wirelessly to implement the connection with smartphones, tablets or other terminal devices. The user can remotely control the switch, dimming, fantasy-color effect and other functions of the wake-up lamp through the mobile phone App or other control devices. Therefore, the convenience and flexibility of using the wake-up lamp are effectively improved.

Further, as shown in FIGS. 2 and 3, a plurality of mounting blocks 15 are arranged at intervals on an inner wall of the housing 10, the mounting blocks 15 are provided with mounting grooves 151, and the first light bar 21 is partially embedded in the mounting grooves 151. In this embodiment, the mounting block 15 is used to fix the first light bar 21. Specifically, the mounting block 15 is provided with a mounting groove 151, the first light bar 21 is partially embedded in the mounting groove 151, and the lamp bead portion of the first light bar 21 is positioned outside the mounting groove 151.

Further, the wake-up lamp further includes a fixing plate 16, where the fixing plate 16 is fixed on the inner wall of the housing 10, one side of the mounting block 15 is fixed on the inner wall of the housing 10, and the other opposite side of the mounting block is fixed on the fixing plate 16, so that the structural strength of the wake-up lamp is effectively improved.

Further, the housing 10 includes a front housing 11 and a rear housing 12, the front housing 11 and the rear housing 12 are fastened to form the mounting cavity, the front housing 11 and the rear housing 12 are provided with the mounting blocks 15, the mounting block 15 of the front housing 11 and the mounting block 15 of the rear housing 12 are spaced apart from each other to form a mounting space, and the first light bar 21 is arranged in the mounting space. In this embodiment, the housing 10 is divided into a front housing 11 and a rear housing 12 to facilitate the assembly of the wake-up lamp, where the front housing 11 and the rear housing 12 are both provided with a mounting block 15, and an interval is formed between the mounting blocks 15 of the front housing 11 and the rear housing 12 to form a mounting space for mounting the first light bar 21. The specific mounting method is to first embed one side of the first light bar 21 on the mounting block 15 of the front housing 11, then fasten the rear housing 12 and the front housing 11, and simultaneously embed the other side of the first light bar 21 on the mounting block 15 of the rear housing 12 to complete the assembly of the first light bar 21 and the housing 10.

Further, the mounting block 15 protrudes from the fixing plate 16 and a portion of the mounting block 15 protruding from the fixing plate 16 is of a slope surface, and the mounting groove 151 is formed on the slope surface. In this embodiment, the arrangement of the mounting block 15 protruding from the fixing plate 16 can effectively prevent the fixing plate 16 from blocking the light of the first light bar 21. Meanwhile, the portion of the mounting block 15 protruding from the fixing plate 16 is of a slope surface, which can further prevent the mounting block 15 from blocking the light of the first light bar 21, thereby affecting the light-emitting effect of the wake-up lamp. Therefore, the practicability of the wake-up lamp can be effectively improved.

Figure 5:
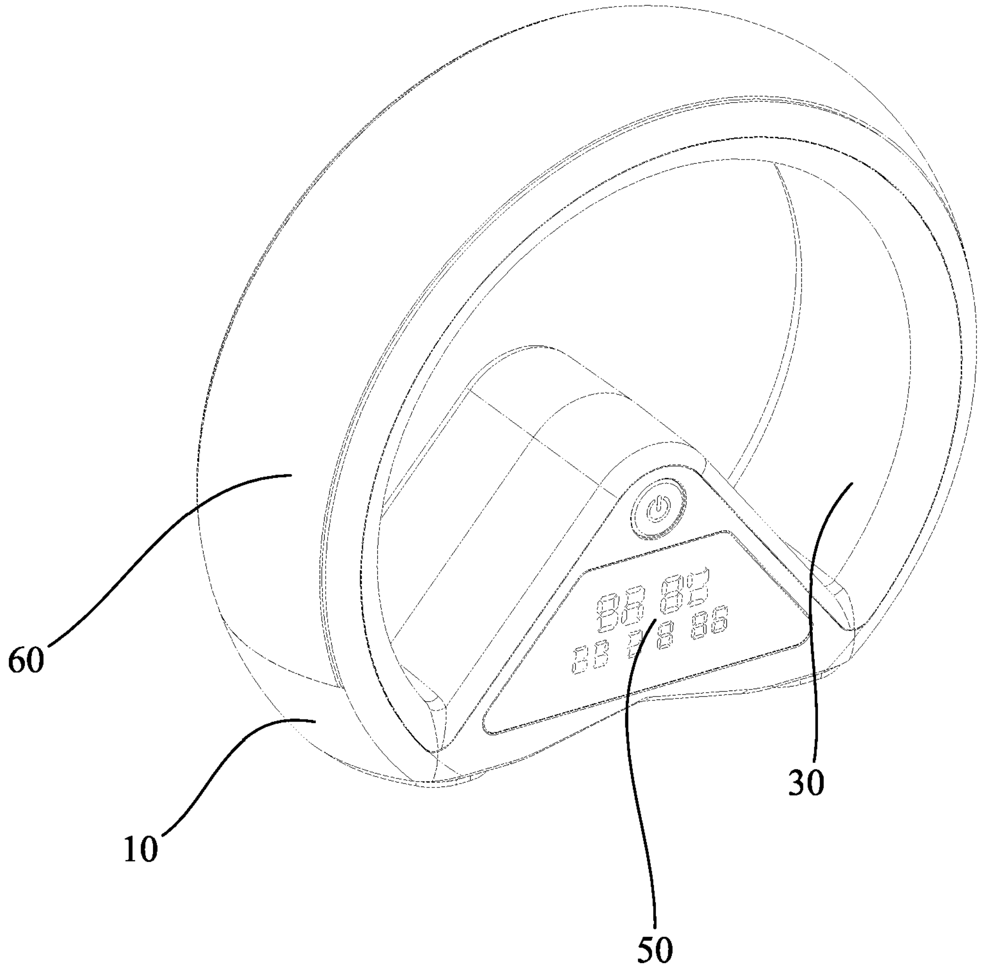
FIG. 5 is a schematic diagram of a structure of another embodiment of a wake-up lamp according to the present utility model.
Figure 6:
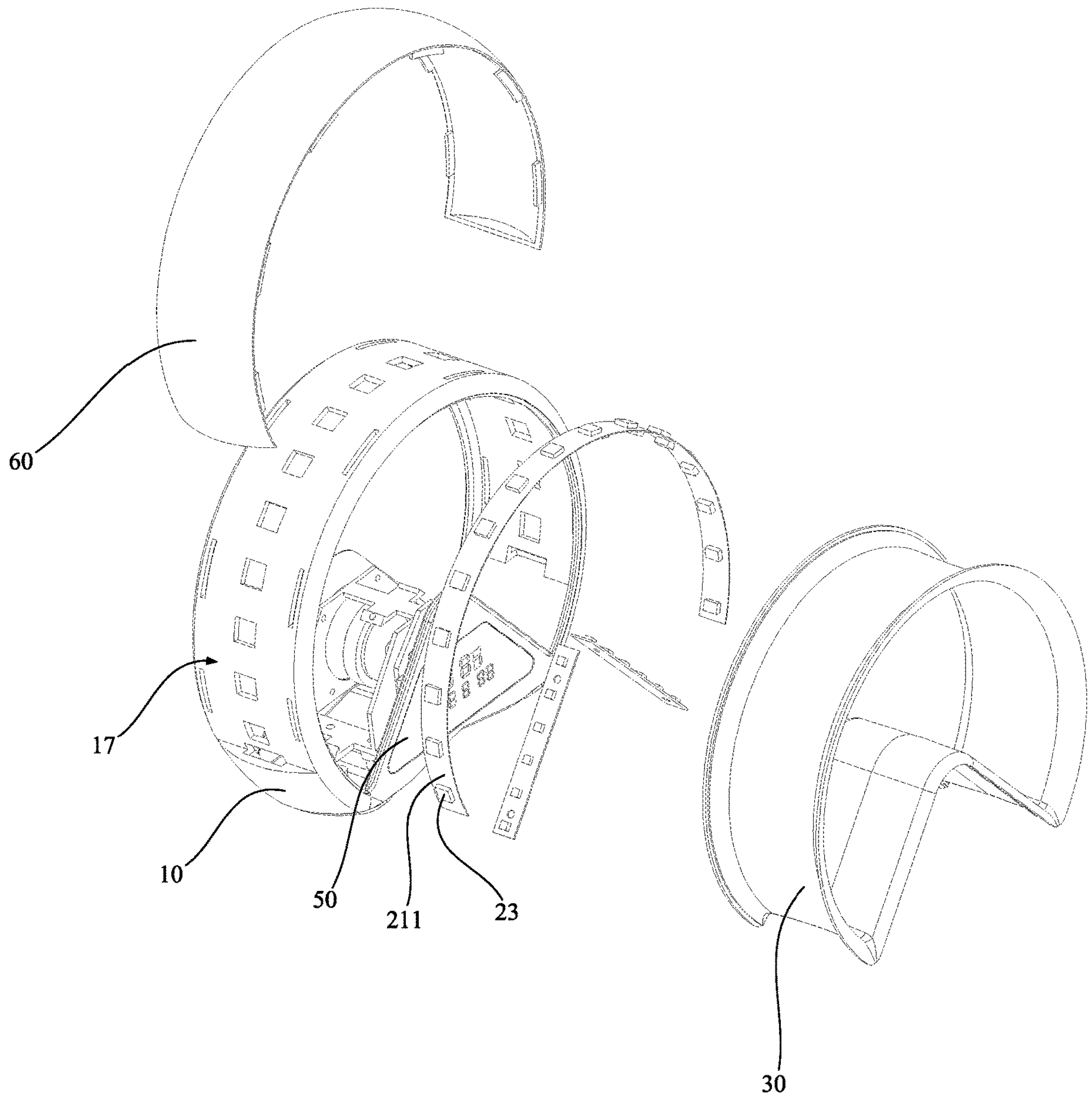
FIG. 6 is a schematic diagram of a structure of an angle decomposition state of another embodiment of a wake-up lamp according to the present utility model.

Further, as shown in FIGS. 5 and 6, the wake-up lamp further includes a second lampshade 60 and a second light bar 23, where a second mounting opening 17 is formed at an outer side of the housing 10, the second lampshade 60 is mounted on the second mounting opening 17, the second light bar 23 is arranged in the mounting cavity and faces the second lampshade 60, and the second light bar 23 includes at least one cold white lamp bead 212 and/or at least one warm white lamp bead 213 and/or at least one RGB colored lamp bead 214. In this embodiment, the wake-up lamp further has another light-emitting surface. Specifically, a second mounting opening 17 is formed at the other side that is of the housing 10 and that is opposite to the first mounting opening 14, and the second lampshade 60 is mounted on the second mounting opening 17. Meanwhile, the second light bar 23 is arranged in the mounting cavity, and the second light bar 23 emits light towards the second lampshade 60, so that the wake-up lamp can emit light on two opposite surfaces, thereby realizing two functions of wake-up and lighting. Therefore, the practicability of the wake-up lamp is effectively improved.

In other embodiments, the first light bar 21 and the second light bar 23 can share one circuit board 211. It can be understood that both sides of the circuit board 211 are provided with lamp beads, and the lamp beads can be at least one of cold white lamp beads 212, warm white lamp beads 213, or RGB colored lamp beads 214, which is not limited herein specifically, and the purpose of the lamp beads is to realize that the light bars can emit light on two sides.

The above mentioned contents are only optional embodiments of the present utility model and are not intended to limit the patent scope of the present utility model, and under the inventive concept of the present utility model, the equivalent structural transformations made by using the contents of the specification and the drawings of the present utility model, or direct/indirect applications to other related technical fields, are all included in the patent protection scope of the present utility model.

The invention claimed is:

1. A wake-up lamp, comprising:

a housing, wherein the housing is annular, a mounting cavity is formed in the housing, a first mounting opening is provided in an inner side of the housing, and the first mounting opening is in communication with the mounting cavity;

a first lampshade, wherein the first lampshade is mounted at the first mounting opening, and a shape of the first lampshade is adapted to that of the housing; a side of the first lampshade away from an axis of the first lampshade is provided with an annular groove;

a light-emitting component, wherein the light-emitting component is arranged in the mounting cavity and comprises at least one first light bar, a shape of the at least one first light bar is adapted to that of the first lampshade, and the at least one first light bar emits light towards the first lampshade; the light-emitting component is covered by the annular groove;

a main control board, wherein the main control board is arranged in the mounting cavity and electrically connected to the light-emitting component so as to control a light-emitting mode of the light-emitting component; and a timing component, wherein the timing component is arranged in the mounting cavity and comprises a timer and an alarm module, and the timer and the alarm module are electrically connected to the main control board.

2. The wake-up lamp according to claim 1, wherein the at least one first light bar comprises a circuit board and a first light source arranged on the circuit board, and the first light source comprises at least one cold white lamp bead and/or at least one warm white lamp bead and/or at least one RGB colored lamp bead.

3. The wake-up lamp according to claim 2, wherein the first light source comprises at least one RGB colored lamp bead, the at least one first light bar further comprises a single chip microcontroller arranged on the circuit board, and the single chip microcontroller is electrically connected to the at least one RGB colored lamp bead.

4. The wake-up lamp according to claim 3, wherein there are a plurality of the first light sources, and the plurality of first light sources are arranged at intervals along a length direction of the circuit board.

5. The wake-up lamp according to claim 1, wherein the main control board comprises a current adjustment module, and the current adjustment module is electrically connected to the at least one first light bar.

6. The wake-up lamp according to claim 1, further comprising a display module arranged on the housing and electrically connected to the main control board.

7. The wake-up lamp according to claim 1, further comprising a voice activated module mounted on and electrically connected to the main control board.

8. The wake-up lamp according to claim 1, further comprising a wireless transmission module arranged on and electrically connected to the main control board.

9. The wake-up lamp according to claim 1, wherein a plurality of mounting blocks are arranged at intervals on an inner wall of the housing, the mounting blocks are provided with mounting grooves, and the at least one first light bar is partially embedded in the mounting grooves.

10. The wake-up lamp according to claim 9, further comprising a fixing plate, wherein the fixing plate is fixed on the inner wall of the housing, one side of the mounting block is fixed on the inner wall of the housing, and qthellan other opposite side of the mounting block is fixed on the fixing plate.

11. The wake-up lamp according to claim 10, wherein the housing comprises a front housing and a rear housing, the front housing and the rear housing are fastened to form the mounting cavity, the front housing and the rear housing are provided with the mounting blocks, the mounting blocks of the front housing and the mounting blocks of the rear housing are spaced apart from each other to form a mounting space, and the at least one first light bar is arranged in the mounting space.

12. The wake-up lamp according to claim 11, wherein each mounting block protrudes from the fixing plate and a portion of each mounting block protruding from the fixing plate is of a slope surface, and the mounting groove is formed on the slope surface.

13. The wake-up lamp according to claim 2, further comprising a second lampshade and a second light bar, wherein a second mounting opening is formed at an outer side of the housing, the second lampshade is mounted on the second mounting opening, the second light bar is arranged in the mounting cavity and faces the second lampshade, and the second light bar comprises at least one cold white lamp bead and/or at least one warm white lamp bead and/or at least one RGB colored lamp bead.

14. The wake-up lamp according to claim 1, wherein the first lampshade is a C-shaped lampshade and has a U-shaped cross section.

* * * * *